(12) United States Patent
Ryu

(10) Patent No.: US 7,832,884 B2
(45) Date of Patent: *Nov. 16, 2010

(54) BACKLIGHT ASSEMBLY HAVING IMPROVED HEAT RELEASING STRUCTURE AND DISPLAY DEVICE HAVING THE SAME

(75) Inventor: Ho-Han Ryu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/419,010

(22) Filed: Apr. 6, 2009

(65) Prior Publication Data

US 2009/0196018 A1    Aug. 6, 2009

Related U.S. Application Data

(63) Continuation of application No. 11/153,011, filed on Jun. 14, 2005, now Pat. No. 7,530,703.

(30) Foreign Application Priority Data

Jun. 14, 2004   (KR) ................. 10-2004-0043463

(51) Int. Cl.
   *G01D 11/28*   (2006.01)
(52) U.S. Cl. .................... 362/29; 362/97; 362/218; 362/225
(58) Field of Classification Search ............ 362/373, 362/32, 27
   See application file for complete search history.

(56) References Cited

U.S. PATENT DOCUMENTS

| 5,008,658 | A | 4/1991 | Russay et al. |
| 5,986,884 | A | 11/1999 | Jairazbhoy et al. |
| 6,480,389 | B1 | 11/2002 | Shie et al. |
| 6,522,543 | B2 | 2/2003 | Kurihara et al. |
| 6,762,807 | B2 | 7/2004 | Lee et al. |
| 6,834,974 | B2 | 12/2004 | Lee et al. |
| 6,880,953 | B2 | 4/2005 | Shin |
| 6,920,046 | B2 | 7/2005 | Spryshak |
| 6,960,001 | B2 | 11/2005 | Nitto et al. |
| 2003/0123258 | A1* | 7/2003 | Nitto et al. ............... 362/373 |
| 2004/0008512 | A1 | 1/2004 | Kim |
| 2005/0099806 | A1 | 5/2005 | Tsai |

FOREIGN PATENT DOCUMENTS

| CN | 2546911 Y | 4/2003 |
| JP | 2002-311418 | 10/2002 |
| JP | 2004-164907 | 6/2004 |
| KR | 10-2004-0006324 A | 1/2004 |

* cited by examiner

*Primary Examiner*—Howard Weiss
*Assistant Examiner*—Steven H Rao
(74) *Attorney, Agent, or Firm*—Innovation Counsel LLP

(57) ABSTRACT

A backlight assembly having an improved heat releasing structure and a display device having the backlight assembly are provided. The backlight assembly includes a plurality of lamps emitting light and a fixing member receiving the plurality of lamps. A separating member protruding from an edge of the fixing member defines an inner space that contains the light-lamp portions in the fixing member, and the separating member separates electrodes of the lamps from the inner space. The separating member has openings that are positioned to direct the heat generated by the lamp electrodes away from the inner space where the excess heat can cause display quality deterioration.

19 Claims, 8 Drawing Sheets

BACKLIGHT ASSEMBLY HAVING IMPROVED HEAT RELEASING STRUCTURE AND DISPLAY DEVICE HAVING THE SAME

CROSS-REFERENCE TO RELATED APPLICATIONS

The present application is a continuation application of U.S. patent application Ser. No. 11/153,011, filed Jun. 14, 2005, and Korean patent application No. 2004-0043463 filed in the Korean Intellectual Property Office on Jun. 14, 2004, the contents of which are herein incorporated by reference in their entirety.

BACKGROUND OF THE INVENTION (a) Field of the Invention

The present invention relates to a backlight assembly having an improved heat releasing structure and a display device having the backlight assembly, and more particularly to a backlight assembly that can efficiently release the heat generated from lamp electrodes to an area external to the assembly and a display device having the backlight assembly.

(b) Description of the Related Art

Due to the recent drastic development of semiconductor technologies, the demand for display devices of a small size, light weight, and improved performance has explosively increased.

Liquid crystal display (LCD) devices, which employ an LCD panel, have been recently spotlighted for providing advantages such as small size, light weight, and low power consumption and have been regarded as a substitute for cathode ray tubes (CRTs). Now, the LCD devices are widely used in information processing apparatuses requiring a display device.

The LCD devices change a specific molecular alignment of liquid crystals with application of voltage. The LCD devices convert the change in optical characteristics such as birefringence, optical rotary power, dichroism, and optical scattering of liquid crystal cells emitting light that result from the change in molecular alignment into visual change. Thus, the LCD devices display data by using modulation of light in the liquid crystal cells.

Since the LCD device is a light-receiving display device that does not emit light by itself, a backlight assembly supplying light to the LCD panel is often provided below the LCD panel. The backlight assembly includes a lamp, a diffusing plate, a reflecting plate, and optical sheets. For the lamp, a cold cathode fluorescent lamp (CCFL) is usually used. CCFL has a small amount of heat emission, generates white light close to natural light, and has a long life.

The heat generated from the lamp is delivered to the reflecting plate adjacent to the lamp by means of radiation, and is released through a bottom chassis contacting the reflecting plate. With an increase in display size driven by user preference, the conventional display devices usually include a plurality of lamps to form an image with sufficient brightness. A large amount of thermal energy is generated from the backlight assemblies of large display devices because of the increase in the number of lamps.

A disadvantage of the conventional bottom chassis structure is its limited ability for releasing the thermal energy. Accordingly, the thermal energy cannot be readily released, thereby increasing the device temperature. As a result, the fluorescent material of the lamps is deteriorated and the life of the lamps is reduced. In addition, the reflecting plate is deteriorated, adversely affecting the performance of the reflecting plate, and the lamp holder is deformed due to the thermal energy generated from the lamp. The vaporization pressure of mercury in the lamps is also affected so that the brightness is reduced with the increase in the number of lamps.

Specifically, in large LCD televisions incorporating a long lamp, current leakage and temperature difference occur between the electrodes. In this case, the temperature of a hot electrode is higher than that of a cold electrode used as a ground electrode. Specifically, in LCD televisions, the temperature of the hot electrode increases more rapidly when turning on the power than when turning off the power. This is because the heat generated from the hot electrode is not released but stays in the vicinity of the hot electrode. The temperature difference reduces the life of the lamps.

A method of directing the heat to prevent these adverse effects of temperature increase in the device is desired.

SUMMARY OF THE INVENTION

The present invention is contrived to solve the above-mentioned problems, and it is an object of the present invention to provide a backlight assembly having an improved heat releasing function.

It is another object of the present invention to provide a display device having the backlight assembly.

According to an aspect of the present invention, a backlight assembly including a plurality of lamps emitting light and a fixing member receiving the plurality of lamps is provided. A separating member protruding from an edge of the fixing member defines an inner space in the fixing member where light-emitting portions of the lamps are located, and the separating member separates electrodes of the lamps from the inner space.

The backlight assembly may further include lamp holders fixing both ends of each lamp, and the separating member may separate the lamp holders from the inner space. Each lamp holder may have a lamp fixing portion fixing the lamp and one or more air holes communicating with the lamp fixing portion. The lamp holders may be adjacent to the separating member, and a protruding portion formed on one surface of each lamp holder may be adjacent to the separating member.

The lamp holders may arranged along opposite ends of the inner space.

The backlight assembly may further include a reflecting sheet that covers the inner space of the fixing member and reflects light, and the lamp holders may be inserted into openings formed in the fixing member.

The separating member may be formed integrally in the fixing member, and it may be formed by cutting and pressing a part of the fixing member. The separating member may be detachable from the fixing member, and it may extend in the arrangement direction of the lamps and may be opened in the longitudinal direction of the lamps.

The backlight assembly may further include a second fixing member fixing the upper portion of the backlight assembly, and the second fixing member may be coupled to the separating member with a screw. The separating member may include a support portion supporting an upper portion of the separating member. A covering member may be attached to the rear surface of the fixing member to separate electrodes of the lamps from the outside, and the separating member may be made of a metal or a resin.

Also the present invention provides a display device including a panel unit displaying an image, and a backlight assembly supplying light to the panel unit. The backlight assembly contains a plurality of lamps emitting light, and a fixing member receiving the plurality of lamps. An inner space for emitting light is formed in the fixing member and a separating member protruding from an edge of the fixing member separates electrodes of the lamps from the inner space.

The backlight assembly may further include lamp holders fixing both ends of each lamp, and the separating member may separate the lamp holders from the inner space. Each lamp holder may have a lamp fixing portion fixing the lamp and one or more air holes communicating with the lamp fixing portion, and the lamp holders may be adjacent to the separating member.

A protruded portion formed on one surface of each lamp holder may be adjacent to the separating member. The lamp holders may be arranged along opposite ends of the inner space, and they may be inserted into openings formed in the fixing member.

The backlight assembly may further include a reflecting sheet which covers the inner space of the fixing member and which reflects light. The separating member may be formed integrally in the fixing member, it may be formed by cutting and pressing a part of the fixing member, it may be detachable from the fixing member, and it may extend in the arrangement direction of the lamps.

The backlight assembly may further include a second fixing member fixing the upper portion of the backlight assembly, and the second fixing member may be coupled to the separating member with a screw. The separating member may include a support portion supporting an upper portion of the separating member, a covering member may be attached to the rear surface of the fixing member to separate electrodes of the lamps from elements outside the display device, and the separating member may be made of a metal or a resin.

The panel unit may be an LCD panel.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EMBODIMENTS

Hereinafter, exemplary embodiments of the present invention will be described in detail with reference to FIGS. 1 to 8.

The exemplary embodiments of the present invention are intended only to exemplify the present invention, but not to limit the present invention.

Figure 1:
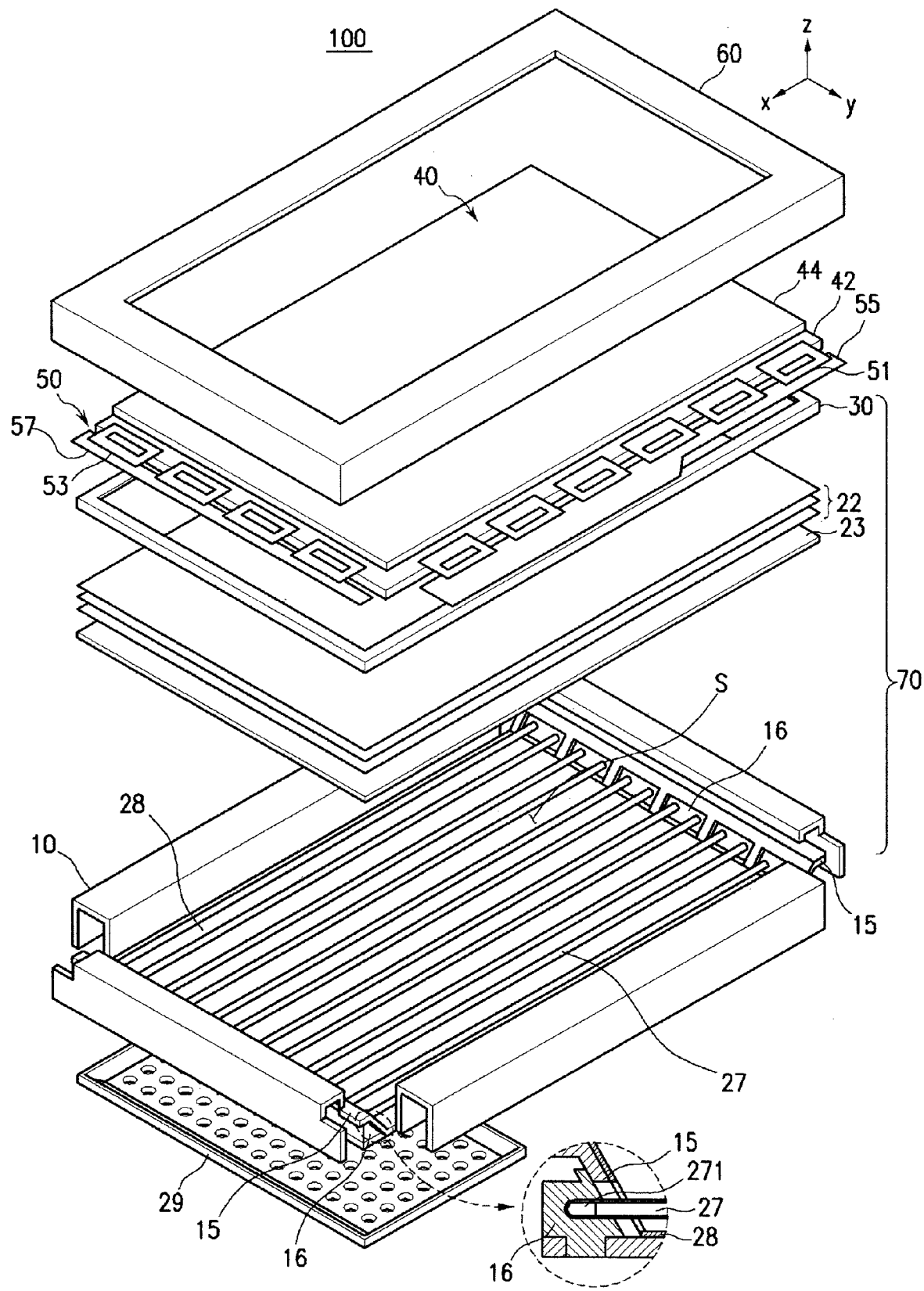
FIG. 1 is an exploded perspective view illustrating a display device having a backlight assembly according to a first embodiment of the present invention.

FIG. 1 shows a display device 100 having a backlight assembly 70 according to a first embodiment of the present invention. A cross-sectional structure of a lamp holder 16 is shown in the enlarged circle of FIG. 1. The structure of the backlight assembly 70 shown in FIG. 1 is intended only to exemplify the present invention, not to limit the present invention. Therefore, the backlight assembly 70 can be modified to other structures.

The display device 100 includes a panel unit 40 displaying an image and a backlight assembly 70 supplying light to the panel unit 40. A top chassis 60 fixes the panel unit 40 onto the backlight assembly 70.

A panel unit assembly 50 includes the panel unit 40, driving IC packages 51 and 53, and printed circuit boards (PCB) 55 and 57. The panel unit assembly 50 may further include other components. A COF (Chip On Film) or TCP (Tape Carrier Package) may be used as the driving IC packages 51 and 53.

Although an LCD panel is shown as the panel unit 40 in FIG. 1, this is intended to exemplify the present invention and not to limit the present invention. Therefore, different panel units may be used.

The panel unit 40 includes a TFT panel 42 having a plurality of thin film transistors (TFT), a color filter panel 44 disposed above the TFT panel 42, and liquid crystal (not shown) interposed between the panels.

The TFT panel 42 is a transparent glass panel on which thin film transistors are formed in a matrix shape. Data lines are connected to the source terminals of the TFT panel 42 and gate lines are connected to the gate terminals thereof. Pixel electrodes made of transparent ITO (Indium Tin oxide), which is a conductive material, are formed in the drain terminals. Accordingly, electrical signals are input to the data lines and the gate lines of the panel unit 40 through the printed circuit boards 55 and 57, the electrical signals are input to the source terminals and the gate terminals of the TFTs. The TFTs are turned on or off in response to the input of the electrical signals, and electrical signals necessary for forming an image are output to the drain terminals.

The color filter panel 44 is disposed above the TFT panel 42 to be opposed to each other. The color filter panel 44 is a panel on which RGB pixels are formed using a thin film process. The RGB pixels are color pixels that exhibit predetermined colors while light passes therethrough. A common electrode made of ITO is formed on the front surface of the color filter panel 44. When power is applied to the gate terminals and the source terminals of the TFTs and thus the TFTs are turned on, an electric field is formed between the pixel electrodes and the common electrode of the color filter panel. The alignment angle of liquid crystal molecules interposed between the TFT panel 42 and the color filter panel 44 is changed by the electric field and the light transmittance is changed in response to the change in alignment angle, thereby obtaining a desired image.

In order to control the alignment angle and the alignment time of the liquid crystal in the panel unit 40, a driving signal and a timing signal are applied to the gate lines and the data lines of the TFTs. A data TCP (51) for determining the application timing of the data driving signal is disposed at the source side of the panel unit 40 and a gate TCP 53 for determining the application timing of the gate driving signal is disposed at the gate side thereof.

The gate PCB 57 and the data PCB 55 receive image signals from a source outside of the panel unit 40 and supply the driving signal to the data lines and the gate lines. For this reason, the gate PCB 57 is connected to the gate TCP 53 at the gate line side of the panel unit 40 and the data PCB 55 is connected to the data TCP 51 at the data line side of the panel unit 40.

The data PCB 55 and the gate PCB 57 generate the data driving signal and the gate driving signal for driving the display device 10 and a plurality of timing signals for supplying these signals at a proper timing. The gate PCB 57 supplies the gate driving signal to the gate lines of the panel unit 40 through the gate TCP 53, and the data PCB 55 supplies the data driving signal to the data lines of the panel unit 40 through the data TCP 51.

The data PCB 55 is connected to a control board (not shown) disposed on the rear surface of the fixing member 10. The data PCB 55 is supplied with the driving signal from the control board and sends the driving signal to the panel unit 40.

The backlight assembly 70 supplies light to the panel unit 40. The backlight assembly 70 includes an optical sheet 22, a diffusing plate 23, a lamp 27, a lamp holder 16, and a reflecting sheet 28. The elements are received by the fixing member 10 and are fixed by a mold frame 30.

A cold cathode fluorescent lamp (CCFL) or an external electrode fluorescent lamp (EEFL) can be used as the lamp 27. The rear surface of the fixing member 10 is provided with an inverter 80 (see FIG. 4), which supplies driving power to the lamp 27. The lamp 27 is electrically connected to the inverter 80 via a lamp wire 82 (see FIG. 4). Both ends of the lamp 27 are provided with the lamp holder 16 which fixes the lamp 27.

The light emitted from the lamp 27 is reflected by the reflecting sheet 28 and travels upward. The reflecting sheet 28 covers the inner space S of the fixing member 10 to reflect the light. Accordingly, it is possible to minimize the loss of light. The diffusing plate 23 uniformly diffuses the light emitted from the lamp 27, preventing the generation of a bright line due to the lamp 27. The optical sheet 22 enhances the brightness of the light passing through the diffusing plate 23.

As shown in FIG. 1, a separating member 15 protrudes from an edge of the fixing member 10. Since the separating member 15 is slanted, the inner space S that holds the light-emitting portion of the lamp 27 is also formed with a slope. Therefore, the inner space S can diffuse the light more efficiently and supply it to the panel unit 40. The separating member 15 defines the inner space S that contains the light-emitting portion of the lamp 27 in the fixing member 10. The separating member 15 separates the electrodes of the lamp 27 from the inner space S. The separating member 15 can block or at least reduce the delivery of heat into the inner space S, thereby preventing the deterioration of internal components. Furthermore, the position of the separating member 15 facilitates the release of the generated heat to an area outside the inner space S.

Figure 4:
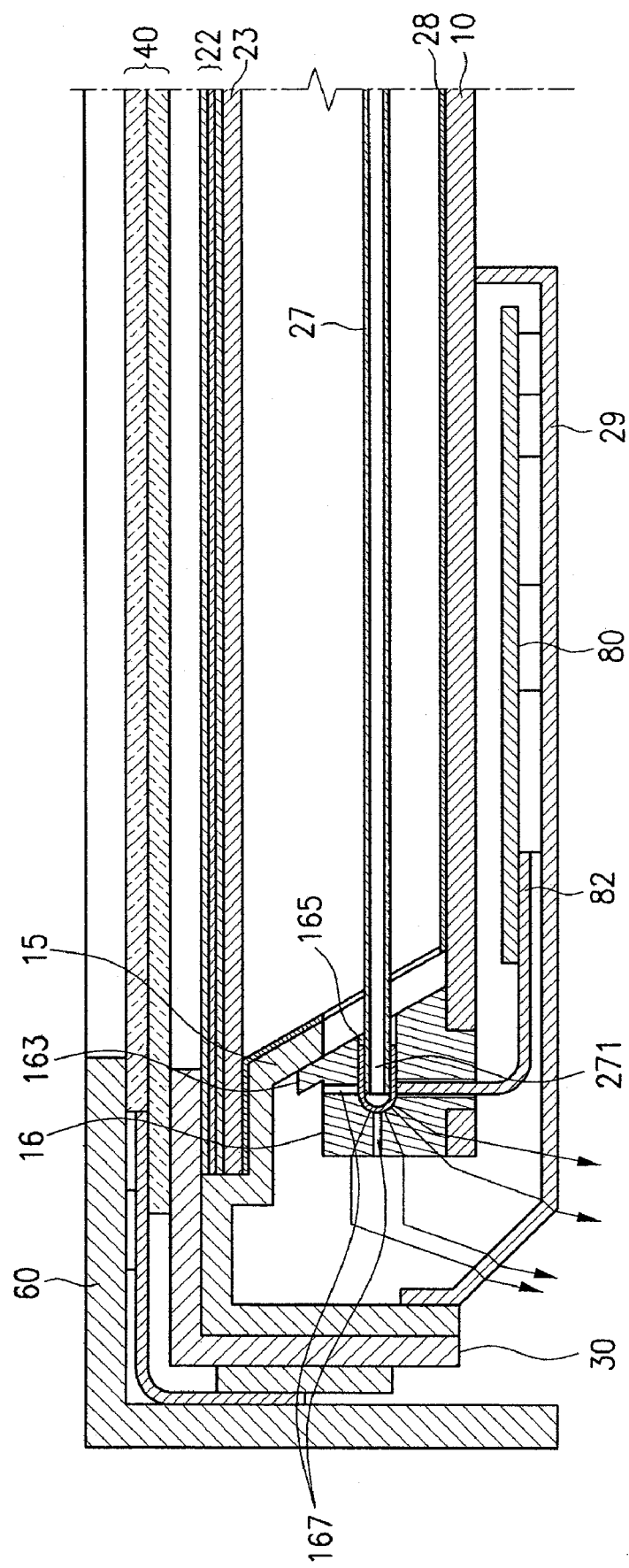
FIG. 4 is a cross-sectional view taken along Line I-I of FIG. 2.

A covering member 29 is attached to the rear surface of the fixing member 10 in order to protect the inverter 80 (see FIG. 4). The covering member 29 also prevents the damage of the electrode 271 of the lamp 27 due to external impacts. Since the electrode 271 is located at the end of the lamp 27, it is likely to be broken by external impacts. Accordingly, it is possible to protect the electrode 271 of the lamp 27 by using the covering member 29 from the outside.

Figure 2:
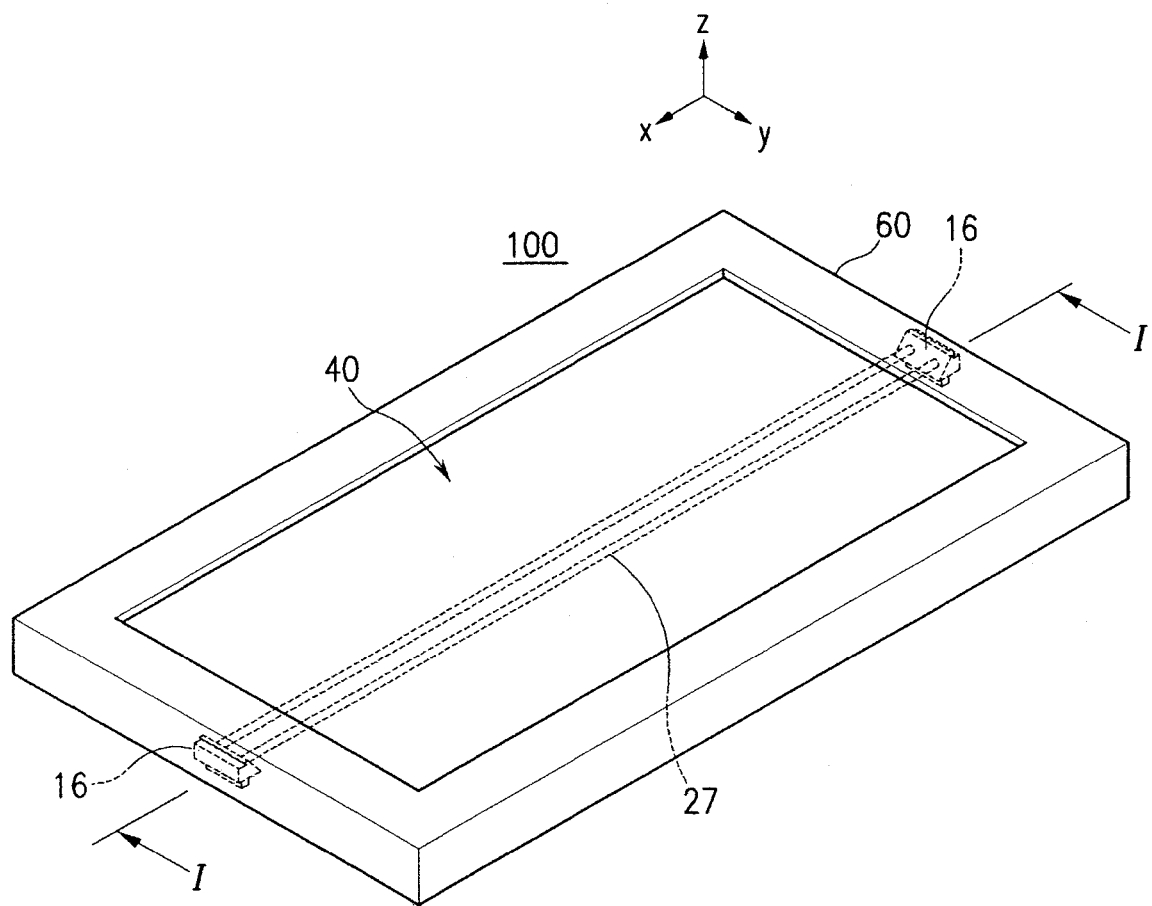
FIG. 2 is a coupled perspective view of the display device shown in FIG. 1.

FIG. 2 shows the state where all the components of the display device 100 shown in FIG. 1 are coupled. The lamp holder 16 shown in FIG. 2 is positioned outside the panel unit 40 but is protected from the external impacts by a shield case (not shown).

Figure 3:
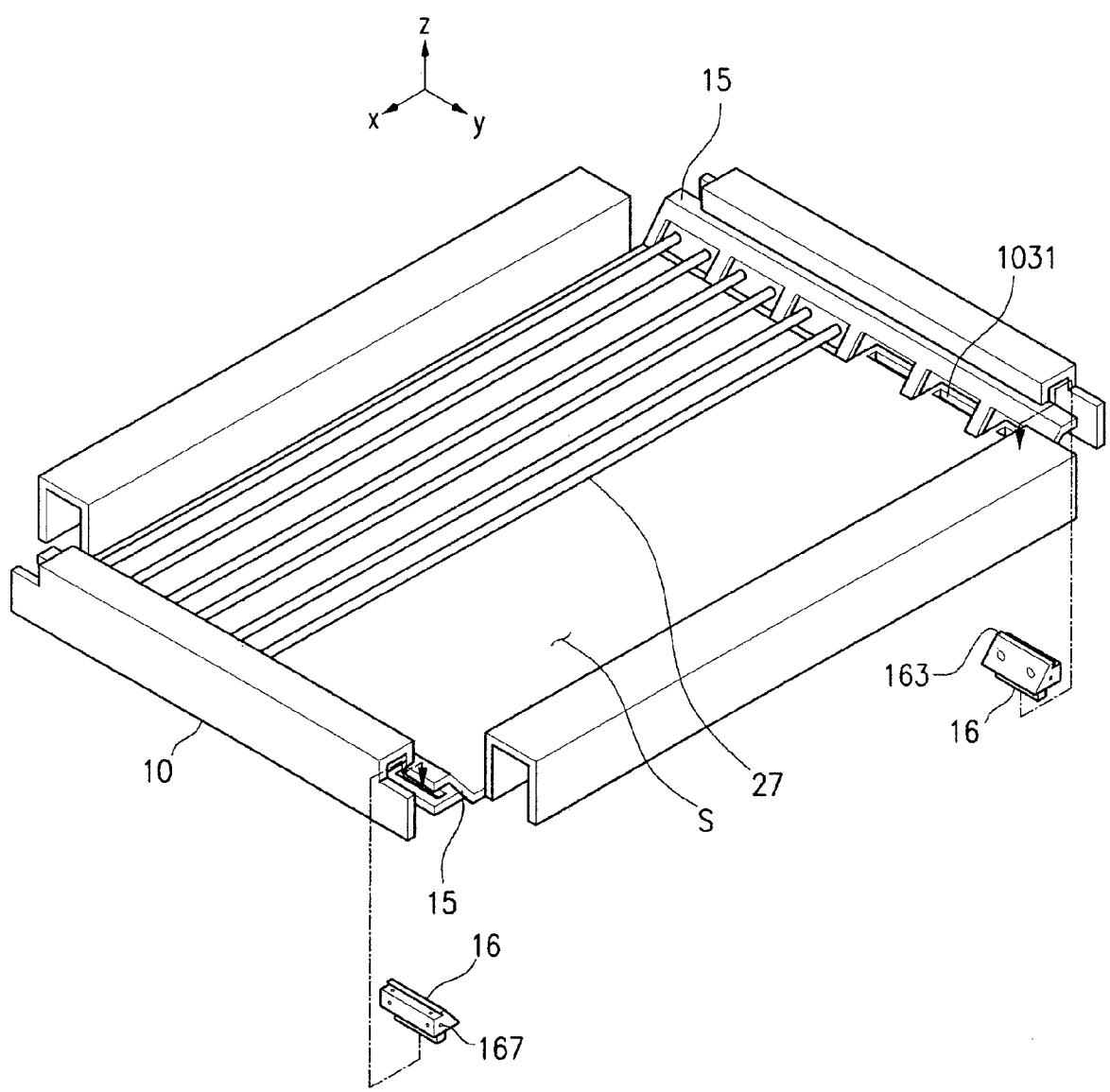
FIG. 3 is an assembly diagram of the backlight assembly according to the first embodiment of the present invention.

FIG. 3 shows an assembling process of fitting the lamp holder 16 to the fixing member 10. As shown in FIG. 3, the lamp holder 16 is fitted to the fixing member 10 from the outside thereof. The lamp holder 16 is inserted into an opening 1031 formed in the fixing member 10. Accordingly, the lamp holders 16 are positioned along opposite edges of the display device 100 with the inner space S between the opposite edges.

The separating member 15 can be formed by cutting and pressing a part of the fixing member 10. Accordingly, the separating member 15 can be formed integrally in the fixing member 10. Since the separating member 15 may not be independently formed, it is possible to reduce the manufacturing cost. The separating member 15 separates the lamp holders 16 from the inner space S. Accordingly, the heat generated from the lamp holder 16 can be efficiently released.

A protruding portion 163 is formed on one surface of each lamp holder 16. The lamp holder 16 has a plurality of air holes 167. The lamp holder 16 is now described in more detail with reference to FIG. 4.

FIG. 4 is a cross-sectional view taken along Line I-I of FIG. 2. The paths through which the heat is released are indicated by arrows in FIG. 4. The protruding portion 163 is formed on one surface of the lamp holder 16 and is adjacent to the separating member 15. Accordingly, the lamp holder 16 can come in close contact with the separating member 15, thereby preventing movement of the lamp holder 16.

The lamp holder 16 has a lamp fixing portion 165 fixing the lamp 27 and one or more air holes 167 communicating with the lamp fixing portion 165. The heat generated from the electrodes 271 of the lamp 27 is released through the air holes 167. Accordingly, it is possible to improve the durability of the lamp 27.

Figure 5:
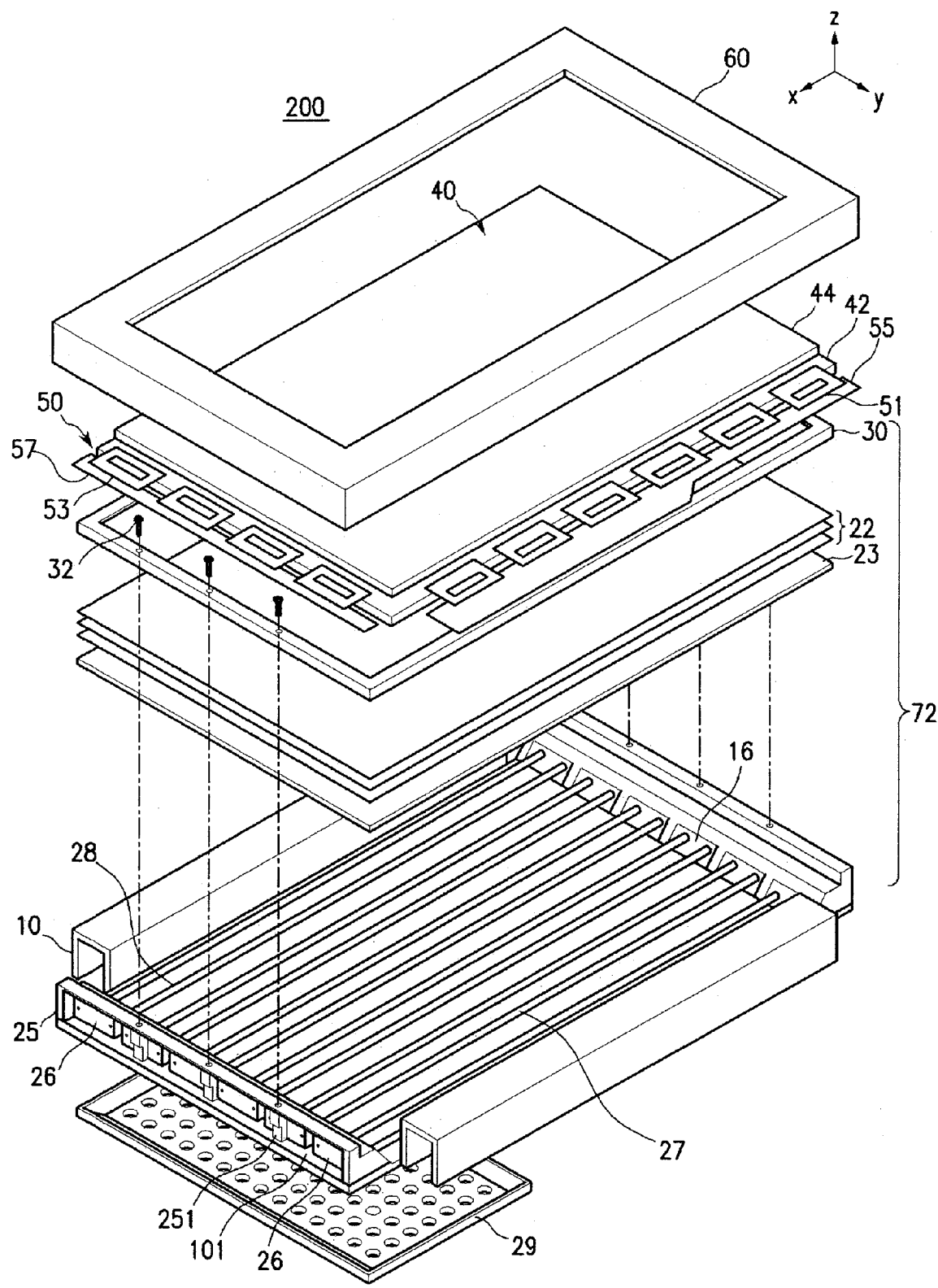
FIG. 5 is an exploded perspective view illustrating a display device having a backlight assembly according to a second embodiment of the present invention.

FIG. 5 shows a display device 200 having a backlight assembly 72 according to a second embodiment of the present invention. Since the display device shown in FIG. 5 is similar to the display device according to the first embodiment of the present invention, the same elements are denoted by the same reference numerals and detailed descriptions thereof are omitted.

The separating member 25 shown in FIG. 5 is detachable from the fixing member 10. Accordingly, the lamp holders 26 can be more easily detached therefrom or attached thereto. The mold frame 30 is coupled to the separating member 25 with screws 32. Therefore, it is possible to firmly fix the separating member 25. The separating member 25 has support portions 251 supporting the top portion thereof and thus has excellent durability. The fixing member 10 can be made of a metal or a resin having excellent durability.

Figure 6:
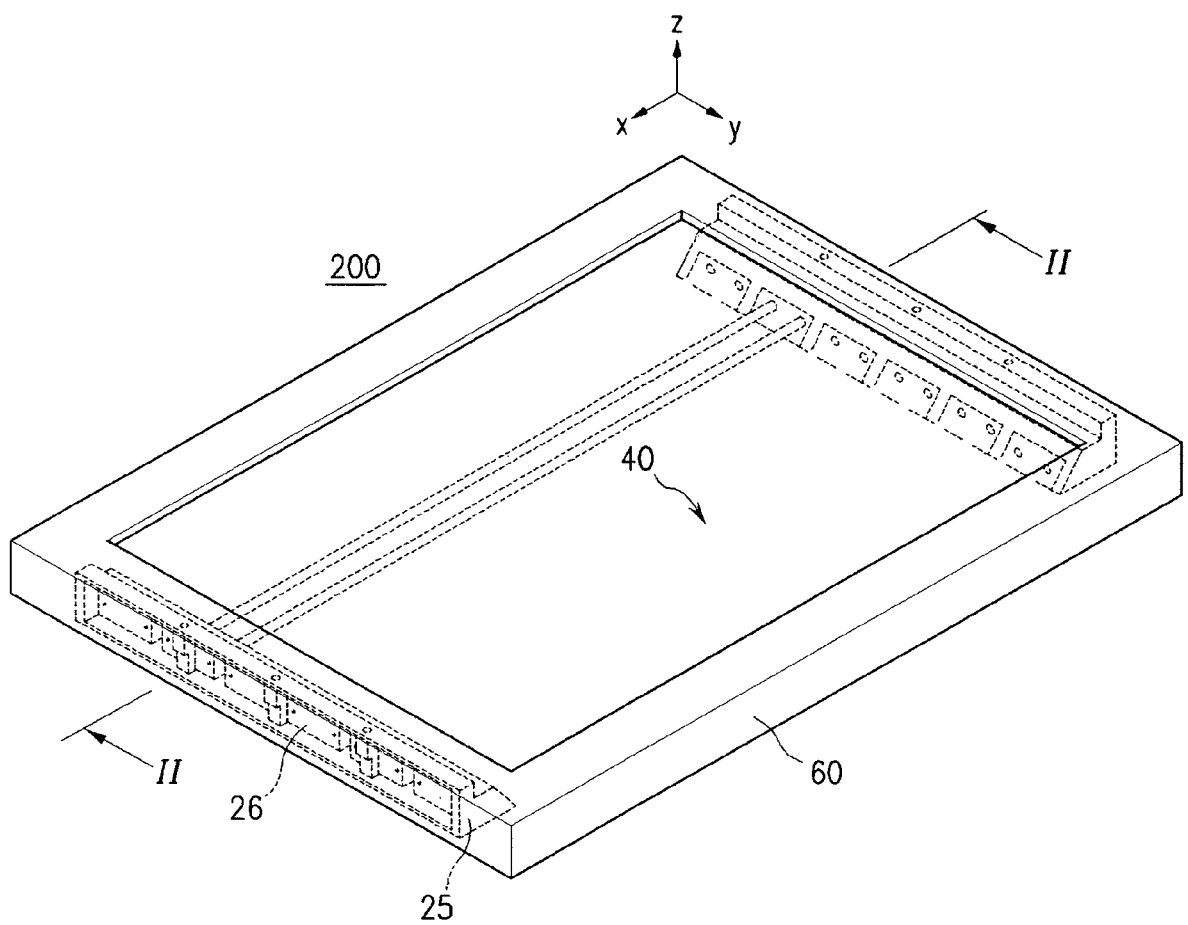
FIG. 6 is a coupled perspective view of the display device shown in FIG. 5.

FIG. 6 shows the state where all the components of the display device 200 shown in FIG. 5 are coupled. The separating member 25 is covered with a covering member attached to the rear surface of the fixing member 10, thereby protecting the electrodes of the lamps from the external impacts.

Figure 7:
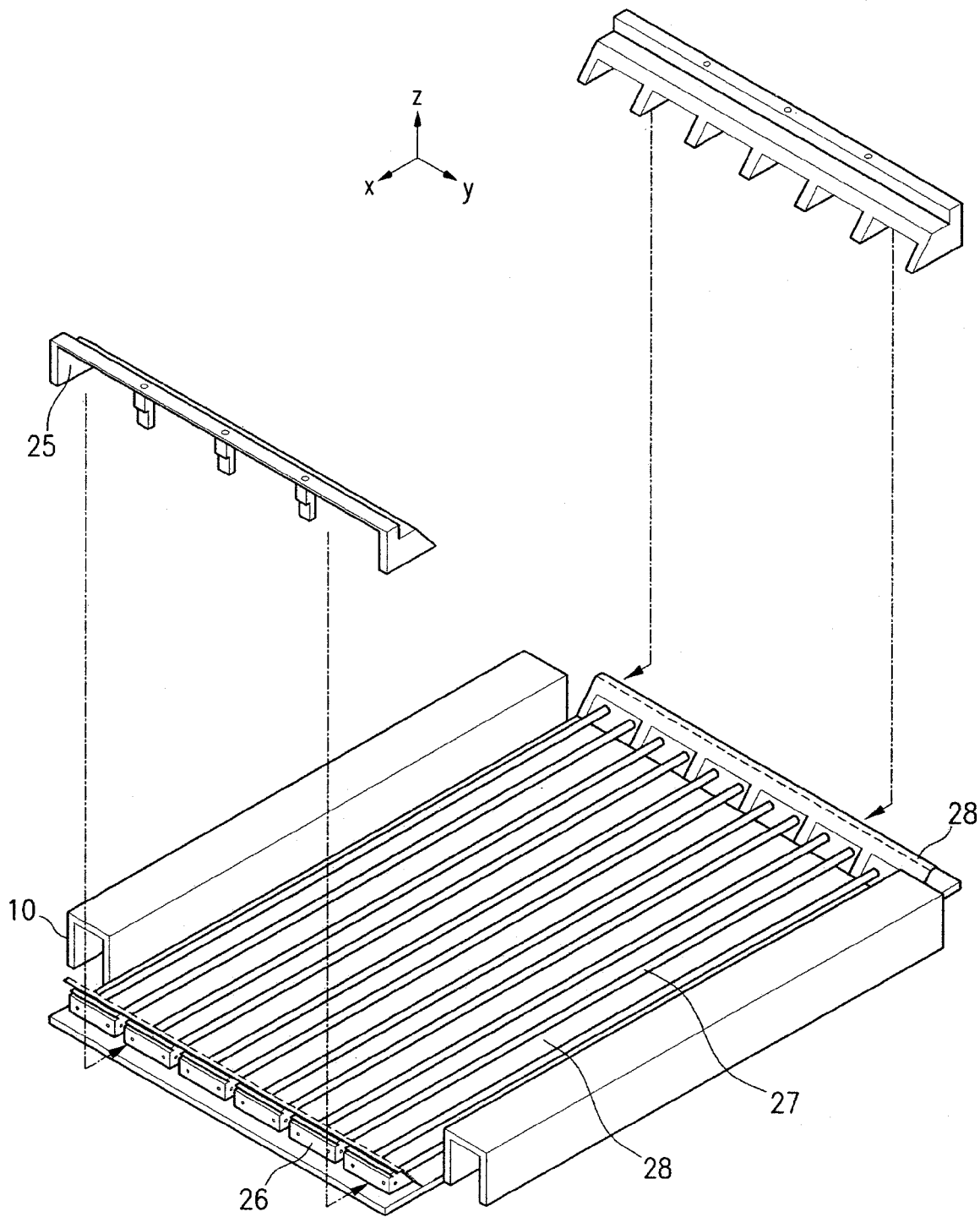
FIG. 7 is an assembly diagram of the backlight assembly according to the first embodiment of the present invention.

FIG. 7 shows an assembling process of the backlight assembly according to the second embodiment of the present invention. As shown in FIG. 7, first, the lamp holders 26 are fixed to the fixing member 10 along with the reflecting sheet 28 and the lamps 27. Next, the separating member 25 is inserted and fixed below the lamp holders 26. The separating member 25 extends in the arrangement direction of the lamps 27, or the direction in which the multiple lamps 27 are arranged (shown as the Y axis direction in the coordinates in FIG. 7). In addition, the separating member 25 is opened in the longitudinal direction of the lamps 27.

Figure 8:
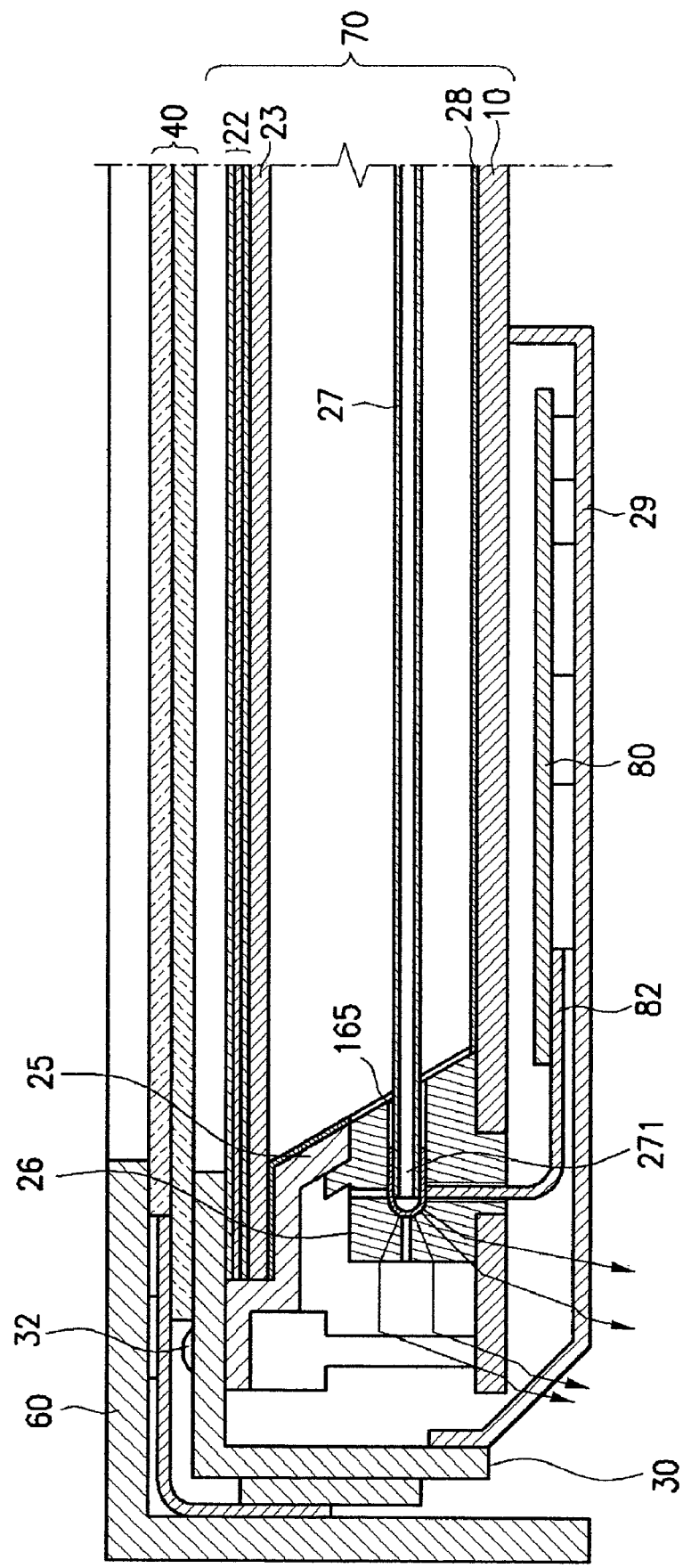
FIG. 8 is a cross-sectional view taken along Line II-II of FIG. 6.

FIG. 8 is a cross-sectional view taken along Line II-II of FIG. 6. As indicated by arrows in FIG. 8, the heat is externally released from the lamp holders 26. Accordingly, it is possible to efficiently remove the heat generated from the electrodes 271 of the lamps 27.

As described above, the backlight assembly according to the present invention can prevent the delivery of heat into the inner space. Therefore, the backlight assembly of the invention extends the life of the lamps and prevents the deterioration of the reflecting sheet.

In addition, since the lamp holders are separated from the inner space by the separating member, it is possible to maximize the effective display area. As a result, the display quality can be improved.

Since the lamp holder is separated from the outside by the covering member, it is possible to protect the electrodes of the lamps from the external impacts.

Although the exemplary embodiments of the present invention have been described, it can be obviously understood by those skilled in the art that the present invention may be modified in various forms without departing from the spirit and scope of the appended claims.

What is claimed is:

1. A backlight assembly comprising:
    a plurality of lamps including electrodes and light-emitting portions;
    a plurality of lamp holders fixing both ends of each lamp, and
    a fixing member receiving the plurality of lamps, the fixing member including a base,
    a separating member protruding from an edge of the base,
    wherein the separating member separates the lamp holders from an inner space where the light-emitting portions of the lamps are located.

2. The backlight assembly of claim 1, wherein the separating member includes a sloped sidewall that meets the base at an angle, the sloped sidewall separating the plurality of lamp holders from the inner space.

3. The backlight assembly of claim 2, wherein the separating member is a portion of a single frame of the fixing member.

4. The backlight assembly of claim 2, wherein the separating member is detachable from the fixing member.

5. The backlight assembly of claim 2, wherein each of the lamp holders includes a protruding portion disposed on one surface of each lamp holder, the protruding portion positioned adjacent to the separating member.

6. The backlight assembly of claim 5, wherein the protruding portion contacts the sloped side wall.

7. The backlight assembly of claim 1, wherein the separating member includes a metal or a resin.

8. The backlight assembly of claim 1, wherein each lamp holder includes one or more air holes exposing the electrodes.

9. The backlight assembly of claim 1, further comprising a reflecting sheet that covers the inner space of the fixing member and reflects light.

10. The backlight assembly of claim 9, further comprising a covering member is attached to the rear surface of the fixing member to separate the plurality of lamps from the outside.

11. The backlight assembly of claim 1, wherein the lamp holders are arranged along opposite ends of the inner space.

12. The backlight assembly of claim 11, wherein the lamps are positioned across the base and the separating member extends in a direction that is substantially perpendicular to the length of the lamps to receive the lamps.

13. A method of assembling a backlight assembly comprising:
    providing a fixing member including a base and a separating member,
    providing a plurality of lamp holders on the base, and
    fixing both ends of each of a plurality of lamps by the plurality of lamp holders, the plurality of lamps including electrodes and light-emitting portions,
    wherein the separating member separates the lamp holders from an inner space where the light-emitting portions of the lamps are located.

14. The method of claim 13, wherein the separating member includes a sloped sidewall that meets the base at an angle, the sloped sidewall separating the plurality of lamp holders from the inner space.

15. The method of claim 14, further comprising cutting and pressing a part of the fixing member to form the separating member.

16. The method of claim 14, wherein the providing of the plurality of lamp holders comprises inserting each of the lamp holders into each of openings formed in the base.

17. A method of assembling a backlight assembly comprising:
    providing a fixing member including a base,
    providing a plurality of lamp holders on the base,
    fixing both ends of each of a plurality of lamps by the plurality of lamp holders, the plurality of lamps including electrodes and light-emitting portions,
    providing a separating member on the plurality of lamp holders,
    wherein the separating member separates the lamp holders from an inner space where the light-emitting portions of the lamps are located.

18. The method of claim 17, wherein the separating member includes a sloped sidewall that meets the base at an angle, the sloped sidewall separating the plurality of lamp holders from the inner space.

19. The method of claim 18, wherein the providing of the separating member comprises coupling the separating member to the base through one or more screws.

* * * * *